April 19, 1960 A. GUYER ET AL 2,933,526
PROCESS FOR THE MANUFACTURE OF UREA IN GRANULAR FORM
Filed Nov. 19, 1956 2 Sheets-Sheet 1

INVENTORS
AUGUST GUYER,
FRITZ MARTI &
TADEUSZ SZTACHELSKI
BY
AGENT.

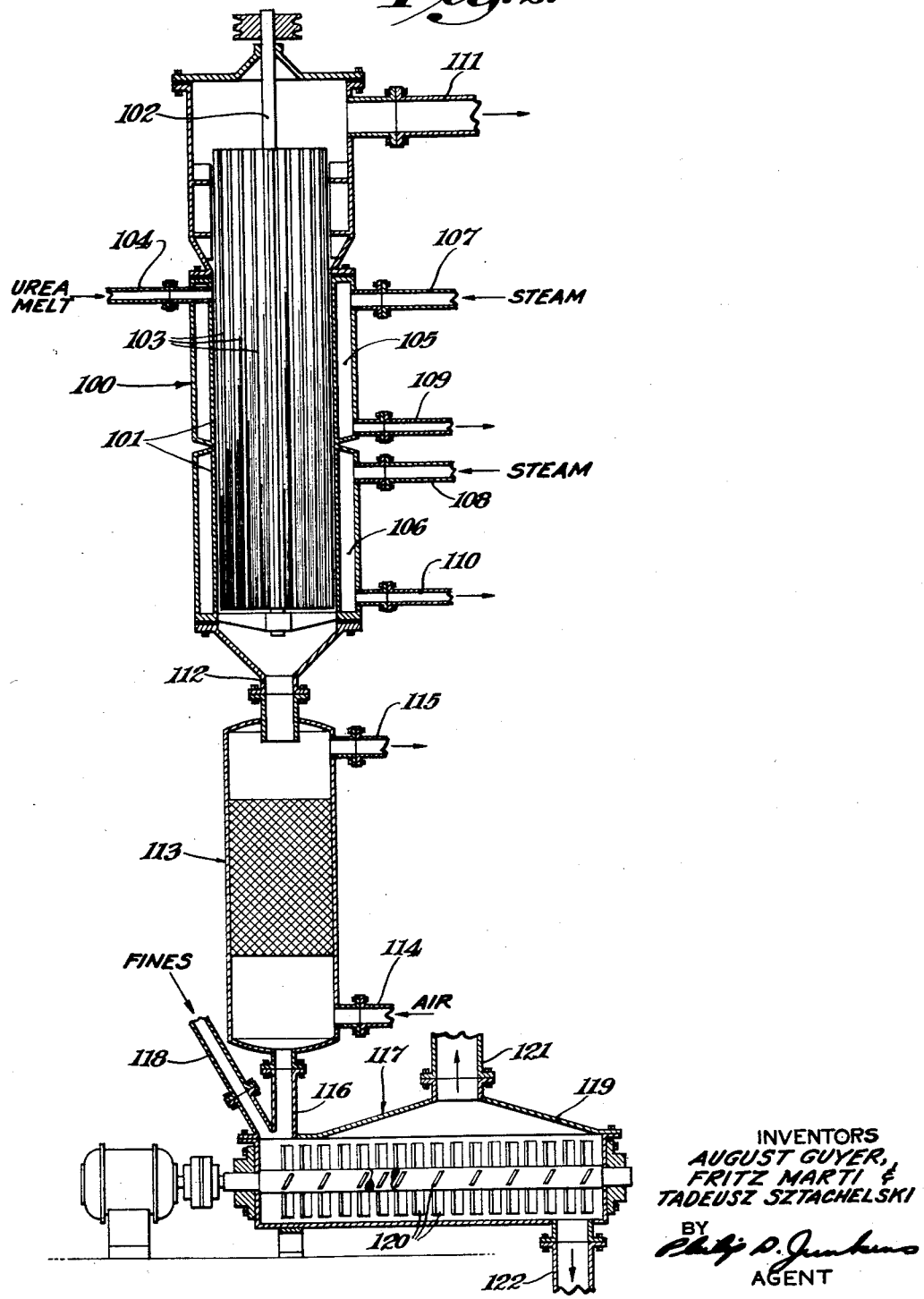

United States Patent Office 2,933,526
Patented Apr. 19, 1960

2,933,526

PROCESS FOR THE MANUFACTURE OF UREA IN GRANULAR FORM

August Guyer, Zurich, Fritz Marti, Basel, and Tadeusz Sztachelski, Visp, Switzerland, assignors to Lonza Electric and Chemical Works Ltd., Basel, Switzerland, a corporation of Switzerland Application November 19, 1956, Serial No. 622,731

Claims priority, application Switzerland February 25, 1956

6 Claims. (Cl. 260—555)

This invention relates to the manufacture of urea in granular form. More particularly the invention relates to an improved method for the continuous production of pure granular urea from an aqueous urea solution.

It is well known that when ammonia and carbon dioxide are subjected to high temperature in a closed system, high pressures are generated and urea is formed. For example, urea synthesis has been conducted at pressures of from about 200–350 atmospheres in an autoclave maintained at temperatures of 160°–220° C. During the synthesis reaction the ammonia and carbon dioxide primarily combine exothermically to form ammonium carbamate which at the temperature of the reaction is transformed into urea and water. The resulting reaction effluent contains in addition to urea and water, uncombined residues of the starting materials and ammonium carbonate, bicarbonate and carbamate.

It is also known to treat such urea synthesis effluent by a number of different procedures to recover from it the ammonia and carbon dioxide which have not been converted to urea and to vaporize the water so as to obtain finally a relatively pure solid form of urea. For example, it has been proposed in U.S. Patent 2,267,133 to vaporize ammonia, carbon dioxide and a portion of the water from the effluent while it is passing rapidly through an externally heated tube. The mixture of liquid and gas leaving the tube is treated to separate the gas from the liquid with the liquid thereafter being passed through a packed tower in countercurrent flow to a stream of hot air. The degassed liquid (75–85% urea) may be obtained by other known procedures and may be treated as above for final drying or may be crystallized in a centrifuge. Also, urea synthesis effluents have been treated by direct contact with steam for distilling the solution up to 95–99% followed by prilling.

The above described processes for obtaining a pure solid form of urea have many inherent disadvantages and shortcomings. Among the most detrimental are: premature crystallization resulting in plugging of apparatus; increased quantities of decomposition products including biuret in the solid urea because of long time high temperature evaporation; high water content in the solid urea requiring further drying with resultant product decomposition; losses of desired product by decomposition; and unusable product forms such as oversize and undersize granules.

It is an object of the present invention to overcome the disadvantages of the prior proposals and to provide a new and improved method for the granulation of urea-containing solutions.

It is a further object of the invention to provide a new and improved economical method of granulating aqueous solutions of urea without an appreciable increase in the content of biuret or other decomposition products.

A still further object of the invention is to provide a new and improved method of granulating aqueous solutions of urea whereby the solid urea product is substantially dry and has no appreciable increase in biuret content.

Other objects and advantages of the invention will be apparent from the following specification in which the preferred embodiments and details of the invention are described.

Accordingly, the present invention accomplishes the above objects by the discovery that substantially water-free urea granules of very low biuret content result from a very rapid partial evaporation of an aqueous urea solution under vacuum or at normal pressure followed by rapid cooling of the solution to just above the temperature of crystallization and substantially immediate granulation of the cooled solution in the presence of solid urea fines. Through the use of the above process, as described in further detail hereinafter, it is possible to obtain a free-flowing granular product containing less than 2% of biuret, such products further having an extremely low water content, for example, 0.1 to 0.2% by weight, and a crushing strength of 300 grams per square millimeter or more. The present invention not only provides a method of obtaining a substantially improved solid urea product but also has the additional advantages of simplicity of control, operation and equipment and reduced investment and operational costs.

The initial short time partial evaporation of the aqueous urea solution may be accomplished in a film-type evaporator wherein the solution is heated to from about 120°–180° C. for less than several minutes depending upon the concentration of urea. By rapidly evaporating only to the extent whereby the solution concentration is approximately 97–99% urea, there is substantially no increase in urea decomposition to form biuret. The concentrated urea liquor leaving the evaporator is quickly cooled by air to a temperature which is just above the crystallization temperature, which may be at about 130°–140° C., such rapid cooling also inhibiting the formation of biuret and further reducing the water content. The cooled concentrated liquor passes directly to a granulation apparatus wherein it is immediately and intimately mixed with solid urea fines (ratio of fines to fresh melt approximately 1:1–3:1 by weight). In the urea melt-urea fines mixture the urea melt quickly crystallizes whereby granulation to a homogeneous product is completed in but a few feet of travel through the granulator with the resultant granules having a solid concentration of 99.8% or higher. An important feature of the process of this invention is that oversized granules and fines (necessary for granulation) never have to be remelted in order to be utilized in forming granulated product. Oversize granules are crushed and reclassified, with the fines from the granulator and from reclassification then being directly introduced to the granulator for mixing with fresh urea melt. In known prior urea prilling or crystallization procedures it has been a requirement that both oversize and undersize prills or crystals must be remelted and mixed with the fresh urea melt. This reheating and melting of solid urea has been a primary cause of undesirable high biuret content in the products of other processes. In the present process all of the solid urea produced has been subjected to high temperatures only once.

The invention is further described by reference to the accompanying drawings which illustrate a preferred embodiment of apparatus for accomplishing the purposes of the invention.

In the drawings:

Figure 2 is an elevation, in section, showing the major apparatus components utilized to accomplish the process of the invention.

Figure 1:
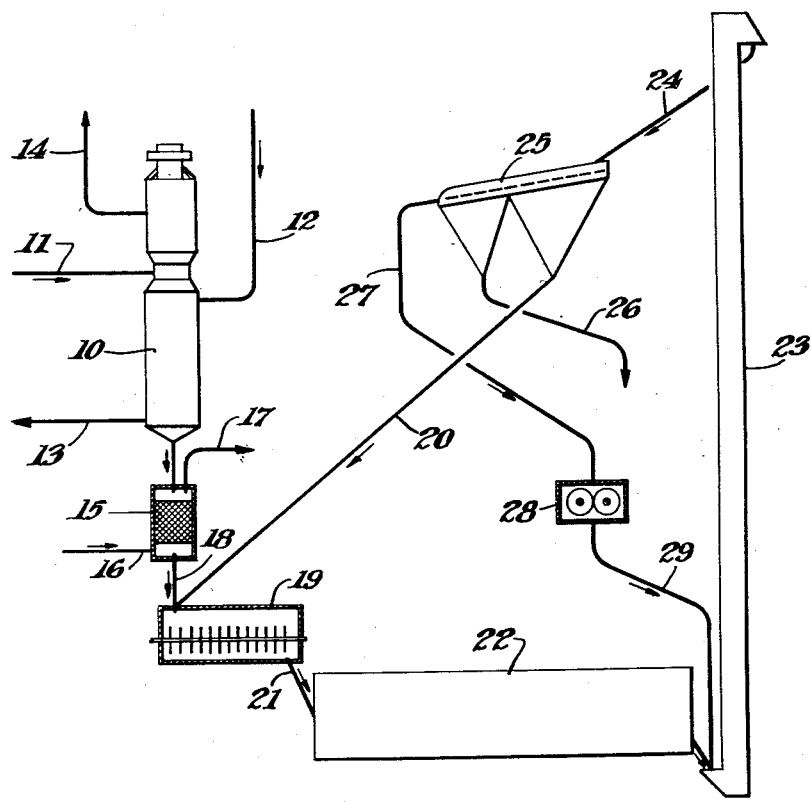
Figure 1 illustrates diagrammatically an arrangement of apparatus which may be employed for conducting the process of the invention.

Referring to Figure 1, an aqueous urea solution to be granulated is introduced to evaporator 10 through line 11. Such evaporator, which may be of agitated-film design, is provided with a heating medium, such as steam, through line 12, such medium being withdrawn at 13. Water vapor, liberated from the urea solution passing through the evaporator, is removed through line 14 and may contain dissolved traces of ammonia and carbon dioxide. After short time heating in evaporator 10, the more concentrated urea melt is rapidly introduced into cooler 15 which may comprise a packed tower through which air passes in counter-current flow with respect to the urea melt. The air entering the cooler through line 16 is withdrawn through line 17. Cooled urea melt, having a concentration of 97–99% urea, is rapidly introduced through line 18 into granulator 19. The granulator, which may be a pug mill or other form of conventional granulating apparatus, receives relatively cold solid urea fines from line 20. The urea melt, which is nearly at its crystallization temperature, immediately upon mixing with the fines becomes a pasty mass and granulates within a few feet of travel through the granulator. After granulation the relatively hot solid urea granules pass through line 21 to cooling drum 22 from which they are elevated by elevator 23 and pass through line 24 to a classifier 25. Fine granules, suitable for return to the granulator (from about 1 to 3 times the quantity of product granules), leave the classifier through line 20. The standard granules, as determined by product specification, leave the classifier through line 26 and form the product output of the plant system. Oversize granules may leave the classifier through line 27 and are crushed in mill 28, thereafter being returned to classifier 25 through line 29, elevator 23 and line 24.

Referring now to Figure 2, there is shown in more detail major components of apparatus which may be utilized in carrying out the invention. The evaporator 100 is of agitated-film design and consists of a vertical heated cylinder 101 containing a rotor 102. The rotor is provided with blades 103 which approach the heated cylinder wall 101 with controlled clearance. The aqueous urea solution is introduced through pipe 104 and is formed quickly into a thin film by the rotating blades 103 and cylinder wall 101. This film rapidly spirals downwardly and is heated by indirect heat exchange through cylinder wall 101. The wall 101 is heated by steam entering steam jackets 105 and 106 through pipes 107 and 108, respectively. After giving up heat to wall 101 the steam in spaces 105 and 106 is removed through pipes 109 and 110, respectively. The water vapor freed from the urea solution rises between the blades 103 and leaves the evaporator through pipe 111. The urea melt (97–99% pure urea) leaves the evaporator 100 through pipe 112. At any given instant during operation there is little liquid solution contained in evaporator 100 and the liquid contact time is very short permitting highly sensitive evaporation.

The 97–99% urea melt leaving the evaporator through pipe 112 substantially immediately passes through cooler 113, which may be a packed tower and through which cooling air is passed, whereby the melt is rapidly cooled to a temperature a few degrees above its crystallization temperature. Air for cooling enters through pipe 114 and is removed under draft through line 115. The cooled urea melt leaves the cooler through pipe 116 and is immediately introduced into granulator 117. Solid urea fines are introduced to the granulator through line 118 for immediate mixing with the melt. The granulator may comprise of a stationary housing 119 in which several impellers 120 rotate in opposing rotation and mix, disintegrate and feed the material along whereby granulation occurs in but a few feet of material travel. A slight draft is maintained on the granulator with moist air being removed through pipe 121. Completely granulated urea is removed through pipe 122 and is cooled and processed as described heretofore.

When operating the above described apparatus or equivalent apparatus it has been observed that an aqueous urea solution (75–85% urea) may be evaporated in a first stage to a concentration of 97–99% urea in less than several minutes at temperatures of between 120°–180° C. without a detrimental increase in biuret content. The nearly water-free urea effluent is quickly cooled to a temperature just above its temperature of crystallization (130°–140° C.) and is then rapidly mixed with cool dry urea solid fines in a granulator (ratio of fines to melt, 1:1 to 3:1) whereby granulation immediately occurs as the melt is cooled to below its temperature of crystallization.

While the manner of application of the invention may be varied widely, particularly with regard to specific apparatus design, the following example describes an operation of the process in apparatus designed substantially as described and embodied in an actual urea granulation plant.

Example

An aqueous urea solution (80% urea) having a temperature of about 100° C. was introduced (200 kgs./hr.) to an agitated-film evaporator heated by saturated steam (pressure of 12 atmospheres). The average residence time of the urea solution in the evaporator was 25 seconds. Samples of the solution leaving the evaporator indicated a 98.5% urea concentration at a temperature of about 160° C. The 98.5% urea melt was substantially immediately introduced to an air cooler of packed tower design. Dry air (100 m.$^3$/1000 kgs. of urea melt) at a temperature of about 25° C. was introduced at the bottom of the cooler for countercurrent flow through the descending urea melt. The concentrated urea melt (99.0% urea concentration) leaving the cooler had an actual temperature of 131° C. (2° C. above the temperature of crystallization) and was immediately introduced to a pug mill type granulator in admixture with cool dry solid urea fines (ratio of fines to melt, by weight =2:1) having an average temperature of 50° C. Granulated urea and fines discharged from the granulator at 90° C. were further cooled in a rotary cooler to 60° C. Samples of the granules were tested and were found to contain less than 0.2% water and less than 2% biuret. The sizes of granulations produced, percent by weight, i.e., oversize (over 3.0 mm.), specification size (1.0–3.0 mm.) and under size (below 1.0 mm.) were about 15.6%, 29.6% and 54.8%, respectively. The crushing strength of the granules was 300 grams per square millimeter.

Where the evaporation step of the above example was carried out under reduced pressure (400 mm. of mercury vacuum) with the other conditions remaining constant and with the cooler operated to provide a final melt temperature of 131° C. (2° C. above the temperature of crystallization) followed by granulation under the above conditions, the granules produced were again found to contain less than 0.2% water with a biuret content of 0.9%.

In both of the procedures above, samples of the granules were tested according to standard A.P.H.A. procedure to determine the turbidity of the solid form of urea. These tests indicated that for both normal and vacuum operation the turbidity of the granules produced by the method of this invention was less than 10 p.p.m.

The advantageous effects of short time, high temperature evaporation followed by rapid cooling and immediate granulation of a degassed urea melt to obtain a substantially dry solid urea product will be apparent from the above example. Further, the low biuret content of the granules make the product granules of the present invention a highly desirable fertilizer material while the extremely low turbidity of such granules provides industry with a new source of solid form urea which can readily be used in combination with other chemicals.

It will be appreciated that various modifications may be made in the invention described above without deviating from the scope thereof as defined in the appended claims.

We claim:

1. A process for the manufacture of substantially dry free-flowing granules of urea from an aqueous urea synthesis effluent substantially free of unconverted ammonia and carbon dioxide: consisting essentially of passing said aqueous urea effluent through an evaporative heating zone; rapidly heating said aqueous urea effluent during its passage through said zone at a temperature below about 180° C. and for a time sufficient to form a concentrated urea effluent containing at least 97% urea by weight; immediately thereafter passing said concentrated urea effluent through a cooling zone wherein said effluent is rapidly cooled to a temperature within a few degrees above its crystallization temperature; immediately thereafter commixing said cooled concentrated urea effluent with cool solid urea fines; and intimately mixing said mixture until granulation thereof to form the substantially dry free-flowing granules of urea.

2. A process for the manufacture of substantially dry free-flowing granules of urea from an aqueous urea synthesis effluent substantially free of unconverted ammonia and carbon dioxide: consisting essentially of passing said aqueous urea effluent through an evaporative heating zone; rapidly heating said aqueous urea effluent during its passage through said zone at a temperature below about 180° C. and for a time sufficient to form a concentrated urea effluent containing at least 97% urea by weight; immediately thereafter passing said concentrated urea effluent through a cooling zone wherein said effluent is rapidly cooled to a temperature within a few degrees above its crystallization temperature whereby the dissociation of urea to biuret is inhibited; immediately thereafter commixing said cooled concentrated urea effluent with cool solid urea fines whereby said cooled effluent is rapidly cooled to below its crystallization temperature, and intimately mixing said mixture until granulation thereof to form substantially dry free-flowing granules of urea whereby the residual water present in said concentrated urea effluent is evaporated by the heat of crystallization during granulation.

3. A process according to claim 2 wherein evaporative heating of the aqueous urea synthesis effluent in said heating zone is carried out under vacuum.

4. A process according to claim 2 wherein the ratio of cool solid urea fines to cooled concentrated urea effluent during commixing thereof is from about 1:1 to 3:1 by weight.

5. A process according to claim 2 wherein the concentrated urea effluent after evaporative heating is rapidly cooled in said cooling zone by contact with relatively cool air whereby cooling of said effluent to a temperature within a few degrees above its crystallization temperature is effected.

6. A process according to claim 2 wherein the concentrated urea effluent after evaporative heating is rapidly cooled in said cooling zone by contact with a relatively cool gaseous medium inert to said effluent whereby cooling of said effluent to a temperature within a few degrees above its crystallization temperature is effected.

References Cited in the file of this patent

UNITED STATES PATENTS

| | | |
|---|---|---|
| 2,307,253 | Yee et al. | Jan. 5, 1943 |
| 2,527,315 | Mackay | Oct. 24, 1950 |

FOREIGN PATENTS

| | | |
|---|---|---|
| 586,025 | France | Dec. 20, 1924 |
| 125,219 | Switzerland | Apr. 2, 1928 |

OTHER REFERENCES

Perry's Chemical Engineers' Handbook, 3rd ed., McGraw-Hill, New York, 1950, pp. 410; 1054–1055.